(12) United States Patent
Liang et al.

(10) Patent No.: US 6,865,012 B2
(45) Date of Patent: Mar. 8, 2005

(54) ELECTROPHORETIC DISPLAY AND NOVEL PROCESS FOR ITS MANUFACTURE

(75) Inventors: Rong-Chang Liang, Cupertino, CA (US); Scott C-J Tseng, San Jose, CA (US); Zarng-Arh George Wu, San Jose, CA (US); Hong Mei Zang, Sunnyvale, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 0 days.

(21) Appl. No.: 10/812,697

(22) Filed: Mar. 29, 2004

(65) Prior Publication Data

US 2004/0246561 A1 Dec. 9, 2004

Related U.S. Application Data

(63) Continuation-in-part of application No. 09/942,532, filed on Aug. 29, 2001, now Pat. No. 6,788,449, which is a continuation-in-part of application No. 09/518,488, filed on Mar. 3, 2000.

(51) Int. Cl.[7] ............................. G02B 26/00; G02F 1/03; G02F 1/29; G09G 3/34; G03G 17/04
(52) U.S. Cl. ...................... 359/296; 359/254; 359/316; 345/107; 430/35
(58) Field of Search ................................. 359/296, 254, 359/316; 345/107, 108, 111; 430/35; 252/572; 204/488

(56) References Cited

U.S. PATENT DOCUMENTS

| 3,229,607 A | 1/1966 | Battaglia |
|---|---|---|
| 3,612,758 A | 10/1971 | Evans |
| 3,668,106 A | 6/1972 | Ota |
| 3,689,346 A | 9/1972 | Rowland |
| 3,885,964 A | 5/1975 | Nacci |
| 3,892,568 A | 7/1975 | Ota et al. |

(List continued on next page.)

FOREIGN PATENT DOCUMENTS

| CA | 2340683 | 2/2001 |
|---|---|---|
| DE | 199 27 359.6 | 12/2000 |
| EP | 0990942 | 4/2000 |
| EP | 1065553 | 1/2001 |
| EP | 1089118 | 4/2001 |
| EP | 1195603 | 4/2002 |
| JP | 57104116 | 6/1982 |
| JP | 59-034518 | 2/1984 |
| JP | 59171930 | 9/1984 |
| JP | 60-205452 | 10/1985 |
| JP | 62-099727 | 5/1987 |

(List continued on next page.)

OTHER PUBLICATIONS

U.S. Appl. No. 09/606,654, filed Jun. 28, 2000.
Drzaic, P.S., "Liquid Crystal Dispersions", The PDLC Paradigm, pp 1–9, (1995).
Singer, B. et al, "X–Y Addressable Electrophoretic Display", Proc. SID 18(3/4), pp–255–266 (1977).

(List continued on next page.)

*Primary Examiner*—Georgia Epps
*Assistant Examiner*—Jack Dinh
(74) *Attorney, Agent, or Firm*—Howrey Simon Arnold & White

(57) ABSTRACT

This invention relates to an electrophoretic display comprising cells of well-defined shape, size and aspect ratio which cells are filled with charged pigment particles dispersed in a solvent, and novel processes for its manufacture.

14 Claims, 12 Drawing Sheets

U.S. PATENT DOCUMENTS

| | | |
|---|---|---|
| 3,908,052 A | 9/1975 | Sanders |
| 3,928,671 A | 12/1975 | Robusto et al. |
| 4,071,430 A | 1/1978 | Liebert |
| 4,093,534 A | 6/1978 | Carter et al. |
| 4,190,352 A | 2/1980 | Bruning |
| 4,285,801 A | 8/1981 | Chiang |
| 4,655,897 A | 4/1987 | Disanto et al. |
| 4,680,103 A | 7/1987 | Beilin Solomon I et al. |
| 4,741,604 A | 5/1988 | Kornfeld |
| 4,741,988 A | 5/1988 | Van der Zande et al. |
| 4,891,245 A | 1/1990 | Micale |
| 4,924,257 A | 5/1990 | Jain |
| 5,177,476 A | 1/1993 | Disanto et al. |
| 5,200,120 A | 4/1993 | Sakai |
| 5,223,106 A * | 6/1993 | Gerace et al. .............. 204/488 |
| 5,274,481 A | 12/1993 | Kim |
| 5,276,438 A | 1/1994 | DiSanto et al. |
| 5,279,511 A | 1/1994 | DiSanto et al. |
| 5,285,236 A | 2/1994 | Jain |
| 5,380,362 A | 1/1995 | Schubert |
| 5,398,041 A | 3/1995 | Hyatt |
| 5,403,518 A | 4/1995 | Schubert |
| 5,432,526 A | 7/1995 | Hyatt |
| 5,450,220 A | 9/1995 | Onishi et al. |
| 5,460,688 A | 10/1995 | Disanto et al. |
| 5,573,711 A | 11/1996 | Hou et al. |
| 5,589,100 A | 12/1996 | Grasso et al. |
| 5,652,645 A | 7/1997 | Jain |
| 5,699,097 A | 12/1997 | Takayama et al. |
| 5,731,860 A | 3/1998 | Harada et al. |
| 5,739,889 A | 4/1998 | Yamada et al. |
| 5,835,174 A | 11/1998 | Clikeman et al. |
| 5,843,333 A | 12/1998 | Hakemi |
| 5,872,552 A | 2/1999 | Gordon, II et al. |
| 5,877,848 A | 3/1999 | Gillette et al. |
| 5,895,541 A | 4/1999 | Kobayashi et al. |
| 5,914,806 A | 6/1999 | Gordon, II et al. |
| 5,930,026 A | 7/1999 | Jacobson et al. |
| 5,942,154 A | 8/1999 | Kim et al. |
| 5,956,112 A | 9/1999 | Fujimori et al. |
| 5,961,804 A | 10/1999 | Jacobson et al. |
| 5,976,405 A | 11/1999 | Clikeman et al. |
| 5,985,084 A | 11/1999 | Summersgill et al. |
| 5,995,190 A | 11/1999 | Nagae et al. |
| 6,017,584 A | 1/2000 | Albert et al. |
| 6,018,383 A | 1/2000 | Dunn et al. |
| 6,037,058 A | 3/2000 | Clikeman et al. |
| 6,064,508 A | 5/2000 | Forgette et al. |
| 6,067,185 A | 5/2000 | Albert et al. |
| 6,113,810 A | 9/2000 | Hou et al. |
| 6,113,836 A | 9/2000 | Sakai et al. |
| 6,120,588 A | 9/2000 | Jacobson |
| 6,120,839 A | 9/2000 | Comiskey et al. |
| 6,120,946 A | 9/2000 | Johnson et al. |
| 6,166,797 A | 12/2000 | Bruzzone et al. |
| 6,172,798 B1 | 1/2001 | Albert et al. |
| 6,184,856 B1 | 2/2001 | Gordon, II et al. |
| 6,191,250 B1 | 2/2001 | Aida et al. |
| 6,239,896 B1 | 5/2001 | Ikeda |
| 6,312,304 B1 | 11/2001 | Duthaler et al. |
| 6,319,381 B1 | 11/2001 | Nemelka |
| 6,327,072 B1 | 12/2001 | Comiskey et al. |
| 6,337,761 B1 | 1/2002 | Rogers et al. |
| 6,392,785 B1 | 5/2002 | Albert et al. |
| 6,392,786 B1 | 5/2002 | Albert |
| 6,400,430 B2 | 6/2002 | Nakao et al. |
| 6,400,492 B1 | 6/2002 | Morita et al. |
| 6,512,626 B1 | 1/2003 | Schmidt |
| 6,514,328 B1 | 2/2003 | Katoh et al. |
| 6,524,153 B1 | 2/2003 | Ikeda et al. |
| 6,525,865 B2 | 2/2003 | Katase |
| 6,652,075 B2 | 11/2003 | Jacobson |
| 2001/0009352 A1 | 7/2001 | Moore |
| 2002/0018043 A1 | 2/2002 | Nakanishi |
| 2002/0029969 A1 | 3/2002 | Yager et al. |
| 2002/0126249 A1 | 9/2002 | Liang et al. |
| 2002/0182544 A1 | 12/2002 | Chan-Park et al. |
| 2002/0188053 A1 | 12/2002 | Zang et al. |
| 2002/0196525 A1 | 12/2002 | Chen et al. |

FOREIGN PATENT DOCUMENTS

| | | |
|---|---|---|
| JP | 64-86116 | 3/1989 |
| JP | 01-300232 | 12/1989 |
| JP | 02223934 | 9/1990 |
| JP | 02-223936 | 9/1990 |
| JP | 02284125 | 11/1990 |
| JP | 02284126 | 11/1990 |
| JP | 04-113386 | 4/1992 |
| JP | 6242423 | 9/1994 |
| JP | 09-160052 | 6/1997 |
| JP | 2000 035677 | 2/2000 |
| JP | 2000 075497 | 3/2000 |
| JP | 2001 042118 | 2/2001 |
| JP | 2001 056653 | 2/2001 |
| WO | WO 97/04398 | 2/1997 |
| WO | WO 98/57226 | 12/1998 |
| WO | WO 99/08151 | 2/1999 |
| WO | WO 99/53373 | 10/1999 |
| WO | WO 99/56171 | 11/1999 |
| WO | WO 00/03291 | 1/2000 |
| WO | WO 00/36649 | 6/2000 |
| WO | WO 00/60410 | 10/2000 |
| WO | WO 00/77571 | 12/2000 |
| WO | WO 01/67170 | 9/2001 |
| WO | WO 02/01281 | 1/2002 |

OTHER PUBLICATIONS

Kazlas, P. et al., "12.1: 12.1" SVGA Microencapsulated Electorphoretic Active Matrix Display for Information Appliances *SID 01 Digest* 152–155 (2001).

Bryning et al., "37.4: Reverse–Emulsion Electrophoretic Display (REED)" *SID 98 Digest* pp. 1018–1021 (1998).

Swanson et al., "5.2: High Performance Electrophoretic Displays" *SID 00 Diges,* pp–29–31 (2000).

Inoue, S. et al., "High Resolution Microencapsulated Electrophoretic Display (EPD) Driven by Poly–Si TFTs With Four–Level Grayscale" *IEEE Transactions on Electron Devices* 49(8), pp–1532–1539 (2002).

Matsuda Y. "Newly designed, high resolution, active matrix addressing in plane EPD" *IDW 02 EP2–3* 1341–1344 (2002).

Ota et al., "Developments in Electrophoretic Displays" *Proc. of SID,* vol. 18/3&4, pp–243–254 (1977).

Kishi, E et al, "5.1 Development of In–Plane EPD", Canon Research Center, SID 00 Digest, pp–24–27.

Ota, et al., Electrophoretic Image Display (EPID) Panel, Wireless Research Laboratory, Matsushita Electric Industrial Company, Ltd., Osaka, 571, Japan, received Feb. 7, 1973, pp–832–836, Jul. 1973.

Murau and Singer, "The Understanding and Elimination of Some Suspension Instabilities in an Electrophoretic Display", Philips Laboratories, Briarcliff Manor, NY 10510, Apr. 10, 1978, J. Appl. Phys. 49(9), pp–4820–4829.

Nakamura, et al, "Development of Electrophoretic Display using Microencapsulated Suspension", NOK Corporation, Kanagawa, Japan & NOK Corporation, Ibaraki, Japan, SID 98 Digest, pp–1014–1017.

J. C. Lewis, "Electrophoretic Displays", Allen Clark Research Centre, The Plessey Company Ltd., Caswell, Towcester, Northants, England, pp–223–240.

Comiskey et al, "An Electrophoretic Ink for All–printed Reflective Electronic Displays", Letters to Nature, MIT, The Media Laboratory, 20 Ames Street, Cambridge, MA 02139–4307, USA, May 1998, pp–253–255.

Dalisa, A. L., "Electrophoretic Display Technology", IEEE Trans. Electron Devices, pp–827–834 (1977).

Harbour, J. R., "Subdivided Electrophoretic Display" Xerox Disclosure Journal, US Xerox Corporation, Stamford, Conn., 4(6):705, Nov. 1979, XP002123212.

Harvey, T.G., "Replication Techniques for Micro–optics", SPIE Proc., vol. 3099, pp–76–82 (1997).

Slafer, W. D. et al, "Continuous Manufacturing of Thin Cover Sheet Optical Media", SPIE Proc., vol. 1663, pp–324–335 (1992).

Hopper, M. A. et al, "An Electrophoretic Display, its Properties, Model and Addressing", IEEE Transactions on Electron Devices, 26(8): 1148–1152 (1979).

* cited by examiner

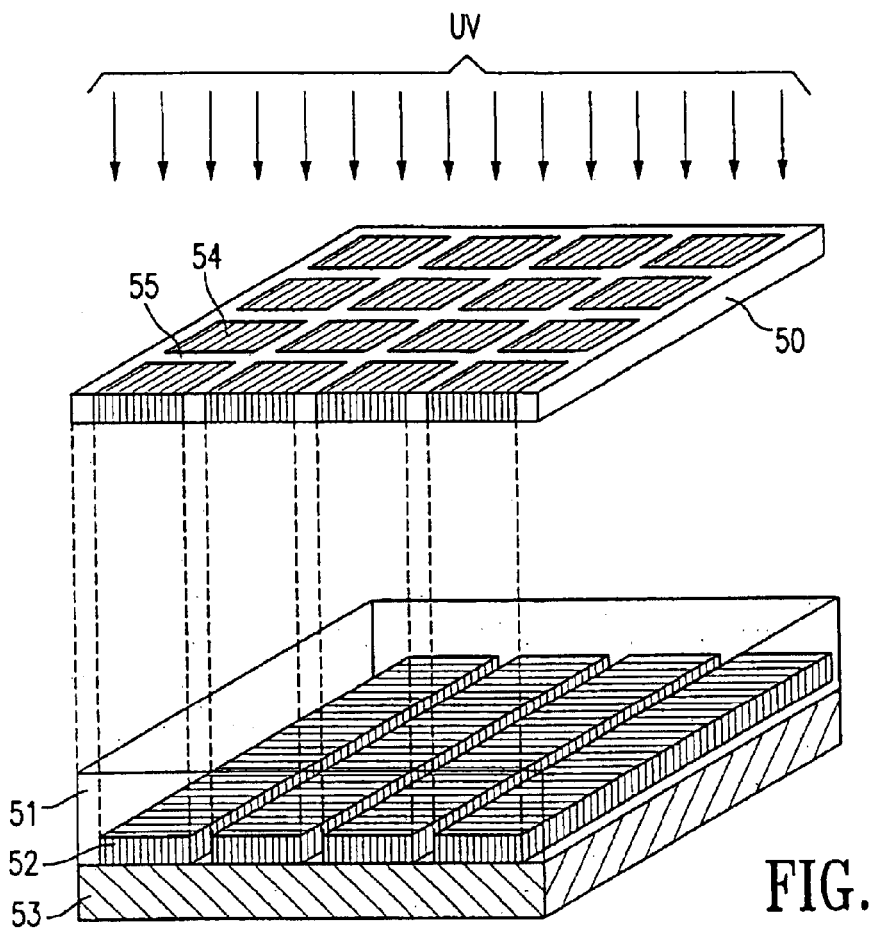
FIG. 5a1
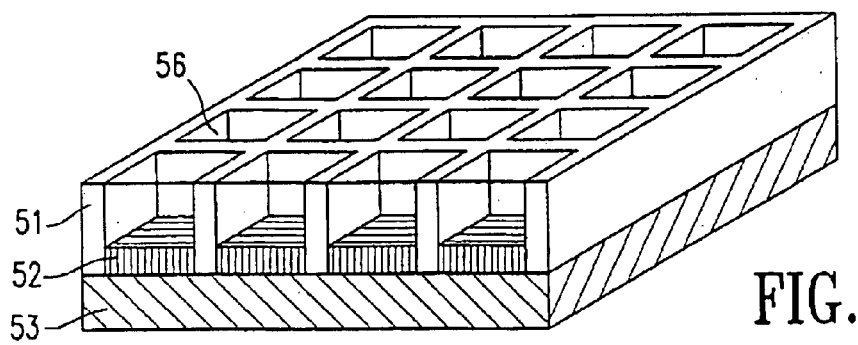
FIG. 5a2

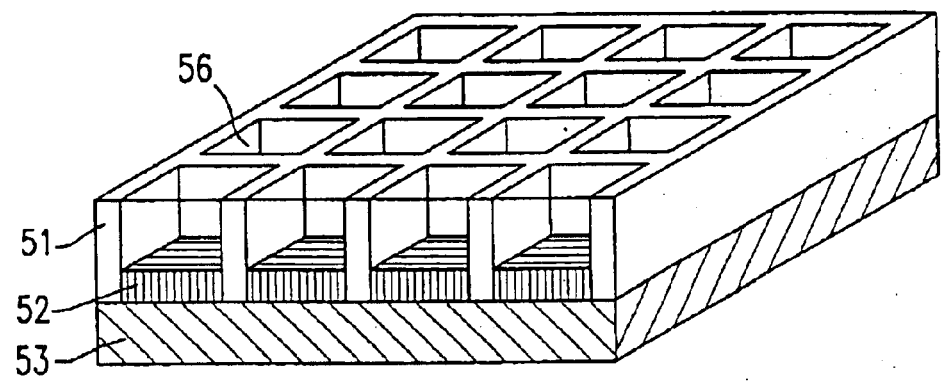
FIG. 5b2
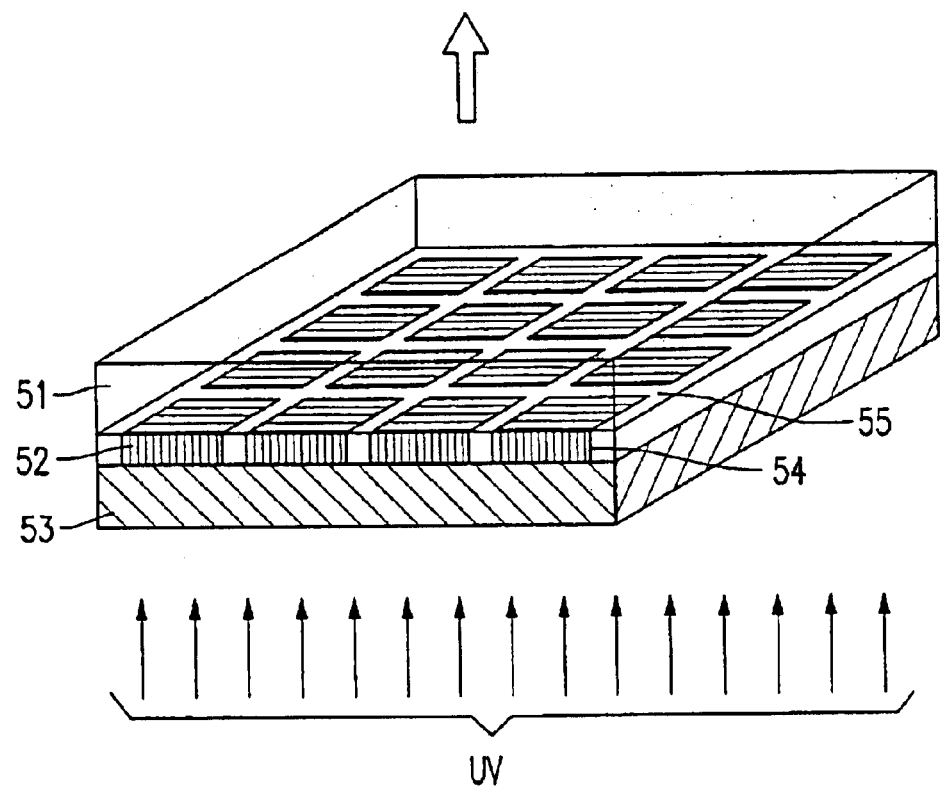
FIG. 5b1

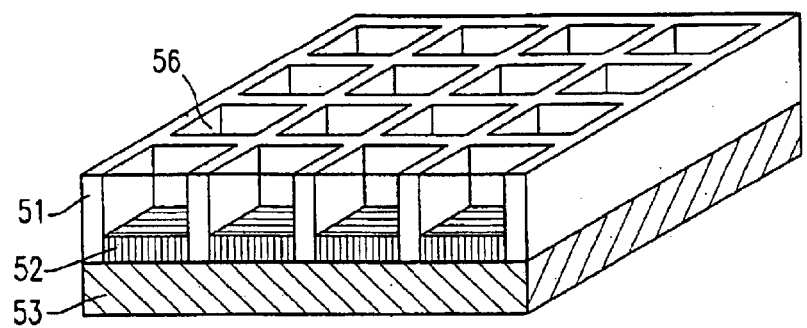
FIG. 5c2
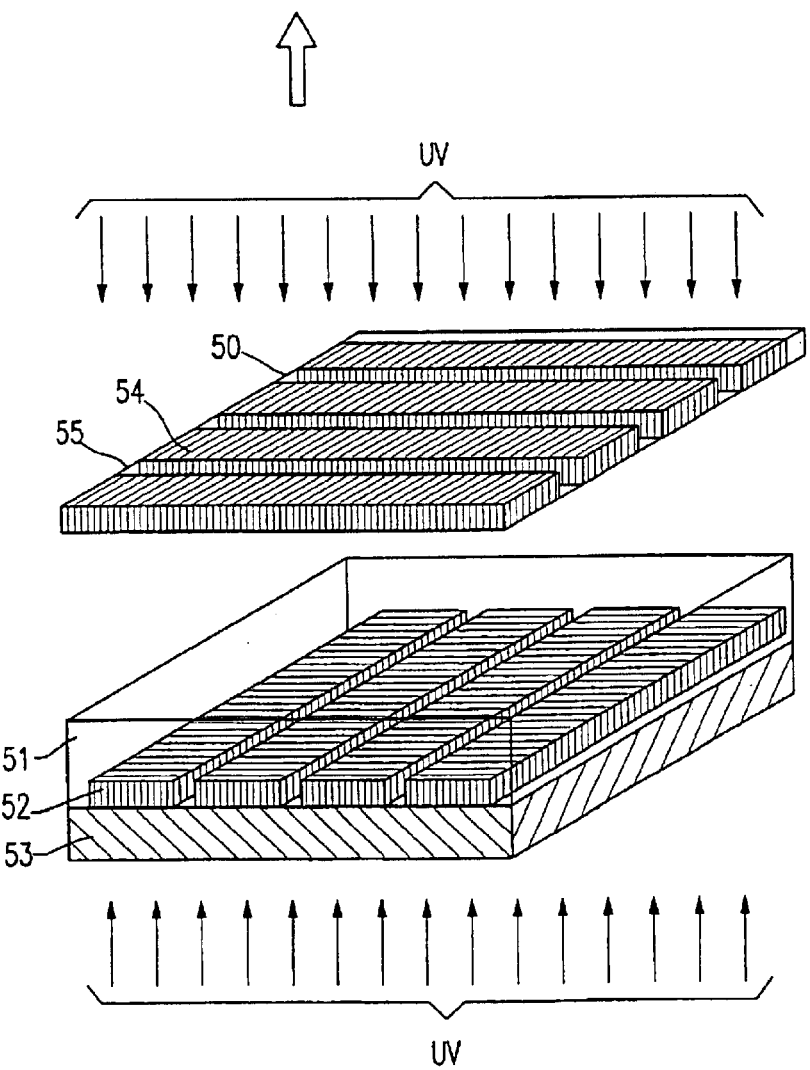
FIG. 5c1

ELECTROPHORETIC DISPLAY AND NOVEL PROCESS FOR ITS MANUFACTURE

This application is a continuation-in-part of U.S. application Ser. No. 09/942,532, filed on Aug. 29, 2001 now U.S. Pat. No. 6,788,449; which is a continuation-in-part of U.S. application Ser. No. 09/518,488, filed on Mar. 3, 2000, the contents of both applications are incorporated herein in their entirety.

BACKGROUND OF THE INVENTION a) Field of the Invention

The application claims an invention directed to an electrophoretic display comprising isolated cells of well-defined shape, size and aspect ratio which cells are filled with charged pigment particles dispersed in a dielectric solvent and sealed, and novel processes for its manufacture.

b) Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by using spacers. One of the electrodes, typically on the viewing side, is transparent. For the passive type of EPDs, row and column electrodes on the top (the viewing side) and bottom plates respectively are needed to drive the displays. In contrast, an array of thin film transistors (TFT) on the bottom plate and a common, non-patterned transparent conductor plate on the top viewing substrate are required for the active type EPDs. An electrophoretic fluid composed of a colored dielectric solvent with charged pigment particles dispersed therein is enclosed between the two electrodes.

When a voltage difference is imposed between the two electrodes, the pigment particles migrate by attraction to the plate of polarity opposite that of the pigment particles. Thus the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages.

EPDs of different pixel or cell structures have been reported previously, for example, the partition-type EPD (M. A. Hopper and V. Novotny, *IEEE Trans. Electr. Dev.*, 26(8):1148–1152 (1979)) and the microencapsulated EPD (U.S. Pat. Nos. 5,961,804, 5,930,026 and 6,017,584). Each of these has its own problems as noted below.

In a partition-type EPD, there are partitions between the two electrodes for dividing the space into smaller cells in order to prevent undesired movement of the particles such as sedimentation. However, difficulties are encountered in the formation of the partitions, the process of filling the display with a fluid, enclosing the fluid in the display, and keeping the suspensions of different colors separated from each other.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules can be formed by interfacial polymerization, in-situ polymerization or other known methods such as physical processes, in-liquid curing or simple/complex coacervation. The microcapsules are typically prepared in an aqueous solution and, to achieve a useful contrast ratio, their mean particle size is relatively large (50–150 microns). The large microcapsule size results in a poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge-controlling agent is often needed in this type of EPDs. However, the microencapsulation process in an aqueous solution imposes a limitation on the type of charge-controlling agents that can be used. Other drawbacks associated with the microcapsule system include poor resolution and poor addressability for color applications.

SUMMARY OF THE INVENTION

The first aspect of the present invention is directed to an improved electrophoretic display comprising isolated cells formed from microcups of well-defined shape, size and aspect ratio and filled with charged pigment particles dispersed in a dielectric solvent. The cells are individually sealed.

Another aspect of the invention relates to a novel process for the manufacture of such an electrophoretic display.

A further aspect of the invention relates to the preparation of cells of well-defined shape, size and aspect ratio. The cells enclose a suspension of charged pigment particles dispersed in a dielectric solvent and are formed from microcups prepared according to the present invention. In one of the preferred embodiments of this invention, the process for the preparation of the microcups involves embossing a thermoplastic or thermoset precursor layer coated on a conductor film with a pre-patterned male mold, followed by releasing the mold during or after the thermoplastic or thermoset precursor layer is hardened by radiation, cooling, solvent evaporation, or other means. Alternatively, in another preferred embodiment of this invention, the microcups may be formed from imagewise exposure of the conductor film coated with a radiation curable layer followed by removing the unexposed areas after the exposed areas have become hardened. In another preferred embodiment of this invention, the microcups may be formed by laminating a spacer film having pre-punched holes onto the conductor film. The adhesion between the pre-punched spacer film and the conductor film may be improved by using an adhesive and a good solvent for the spacer film. Heat or UV radiation may also be applied to enhance the adhesion.

Solvent-resistant, thermomechanically stable microcups having a wide range of size, shape, and opening ratio can be prepared by any of the aforesaid methods. The microcups are then filled with a suspension of charged pigment particles in a dielectric solvent, and sealed.

Yet another aspect of the present invention relates to the sealing of the microcups filled with the electrophoretic fluid containing a dispersion of charged pigment particles in a dielectric fluid. Sealing can be accomplished by a variety of ways. In one of the preferred approaches, it is accomplished by dispersing a thermoplastic or thermoset precursor in the electrophoretic fluid before the filling step. The thermoplastic or thermoset precursor is immiscible with the dielectric solvent and has a specific gravity lower than that of the solvent and the pigment particles. After filling, the thermoplastic or thermoset precursor phase separates from the electrophoretic fluid and forms a supernatant layer at the top of the fluid. The sealing of the microcups is then conveniently accomplished by hardening the precursor layer by solvent evaporation, interfacial reaction, moisture, heat, or radiation. UV radiation is the preferred method to seal the microcups, although a combination of two or more curing mechanisms as described above may be used to improve the yield and throughput of the sealing step.

Alternatively, the sealing can be accomplished by overcoating the electrophoretic fluid with a solution containing the thermoplastic or thermoset precursor, particularly when the sealing precursor is at least partially compatible with the dielectric solvent. The sealing is then accomplished by hardening the precursor by solvent evaporation, interfacial reaction, moisture, heat, radiation, or a combination of curing mechanisms. Interfacial polymerization followed by UV curing is very beneficial to this sealing process. Intermixing between the electrophoretic layer and the overcoat is significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is significantly lower than that of the electrophoretic fluid. The two-step overcoating process is particularly useful when the dye used is at least partially soluble in the sealing material. Additives such as surfactants and filler particles may also be used to further enhance the properties of the sealing layer. The sealing processes are especially unique features of the present invention.

Yet another aspect of the present invention relates to a multiple step process for the manufacture of a monochrome electrophoretic display comprising isolated cells having well-defined shape, size and aspect ratio. The processing steps include preparation of the microcups by any one of the methods described above, filling the microcups with an electrophoretic fluid, sealing and isolating the filled microcups, and finally laminating the sealed and isolated microcups with a second conductor film pre-coated with an adhesive layer. This multiple-step process can be carried out roll-to-roll continuously.

Yet another aspect of the present invention relates to a process for the manufacture of a full color electrophoretic display by laminating or coating the preformed microcups with a layer of positively working photoresist, selectively opening a certain number of the microcups by imagewise exposing the positive photoresist, followed by developing the photoresist, filling the opened microcups with a colored electrophoretic fluid, and sealing the filled microcups by a sealing process. These steps may be repeated to create sealed microcups filled with electrophoretic fluids of different colors.

The microcup structure and the sealing processes enable a format flexible, efficient roll-to-roll continuous manufacturing process for the preparation of EPDs. The displays can be prepared on a continuous web of a conductor film such as ITO/PET by, for example, (1) making the microcup structure on a conductor film by the microembossing or photolithographic method, or by laminating with a spacer film having pre-punched holes, (2) filling the microcups with an electrophoretic fluid and sealing the filled microcups, (3) laminating the sealed microcups with the other conductor film, and (4) slicing and cutting the display to a desirable size or format for assembling.

Alternatively, an electrophoretic display of the present invention may be prepared by (1) forming the microcup structure directly on a first non-conducting substrate by the microembossing or photolithographic method, or by laminating with a spacer film having pre-punched holes as described above, (2) forming a first conductor film on the surface of microcups including the side surface and bottom surface of the microcups and the top surface of the partition walls, (3) filling the microcups with an electrophoretic fluid and sealing the filled microcups and (4) laminating or depositing a second conductor film onto the sealed microcups, optionally with an adhesive layer. If the second conduct film is deposited by, for example, thin film sputtering or vapor deposition, a second non-conducting substrate layer may be laminated onto the second conductor film, optionally with an adhesive layer. The display panel prepared by this alternative method may then be sliced or cut into a desired size or format for assembling. In this embodiment, the first conductor film is placed between the microcup surface and the electrophoretic fluid. Optionally, an electrode protective layer may be coated onto the first conductive layer before the filling and sealing of the electrophoretic fluid. The first conductor layer may be patterned by a variety of methods, the details of which are given below.

The multiple-step processes as disclosed in the present application may be carried out roll-to-roll continuously or semi-continuously. Consequently, they are suitable for high volume and low cost production. These processes are also efficient and inexpensive as compared to other processes for high volume production operations.

One of the major advantages of the EPDs of the present invention, is that the microcup wall is in fact a built-in spacer to keep the top and bottom substrates apart at a fixed distance. The mechanical properties and structural integrity of microcup displays are significantly better than any prior art displays including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive which would limit and predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut to almost any dimensions without the risk of damaging the display performance due to the loss of display fluid in the active areas. In other words, the microcup structure enables a format flexible display manufacturing process, wherein the process produces a continuous output of displays in a large sheet format which can be cut to any desired format. The isolated microcup or cell structure is particularly important when the cells are filled with fluids of different specific properties such as colors and switching rates. Without the microcup structure, it will be very difficult to prevent the fluids in adjacent areas from intermixing, or being subject to cross-talk during operation.

The electrophoretic display prepared according to the present invention is not sensitive to environment, particularly humidity and temperature. The display is thin, flexible, durable, easy-to-handle, and format-flexible. Since the electrophoretic display prepared according to the present invention comprises isolated cells of favorable aspect ratio and well-defined shape and size, the bi-stable reflective display has excellent color addressability, high contrast ratio, and fast switching rate. The drawbacks of electrophoretic displays prepared by the prior art processes are therefore all eliminated.

BRIEF DESCRIPTION OF THE DRAWINGS

FIGS. 5a–5c show alternative processing steps for preparing the microcups involving imagewise exposure of the conductor film coated with a thermoset precursor to UV radiation.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing, imagewise exposure or a spacer film with prepunched holes.

The term "cell", in the context of the present invention, is intended to mean the single unit formed from a sealed microcup. The cells are filled with charged pigment particles dispersed in a solvent or solvent mixture.

The term "well-defined", when describing the microcups or cells, is intended to indicate that the microcup or cell has a definite shape, size and aspect ratio which are pre-determined according to the specific parameters of the manufacturing process.

The term "isolated" refers to the cells which are individually sealed with a sealing layer.

The term "aspect ratio" is a commonly known term in the art of electrophoretic displays. In this application, it refers to the depth to width or depth to length ratio of the microcups.

PREFERRED EMBODIMENTS

Figure 1:
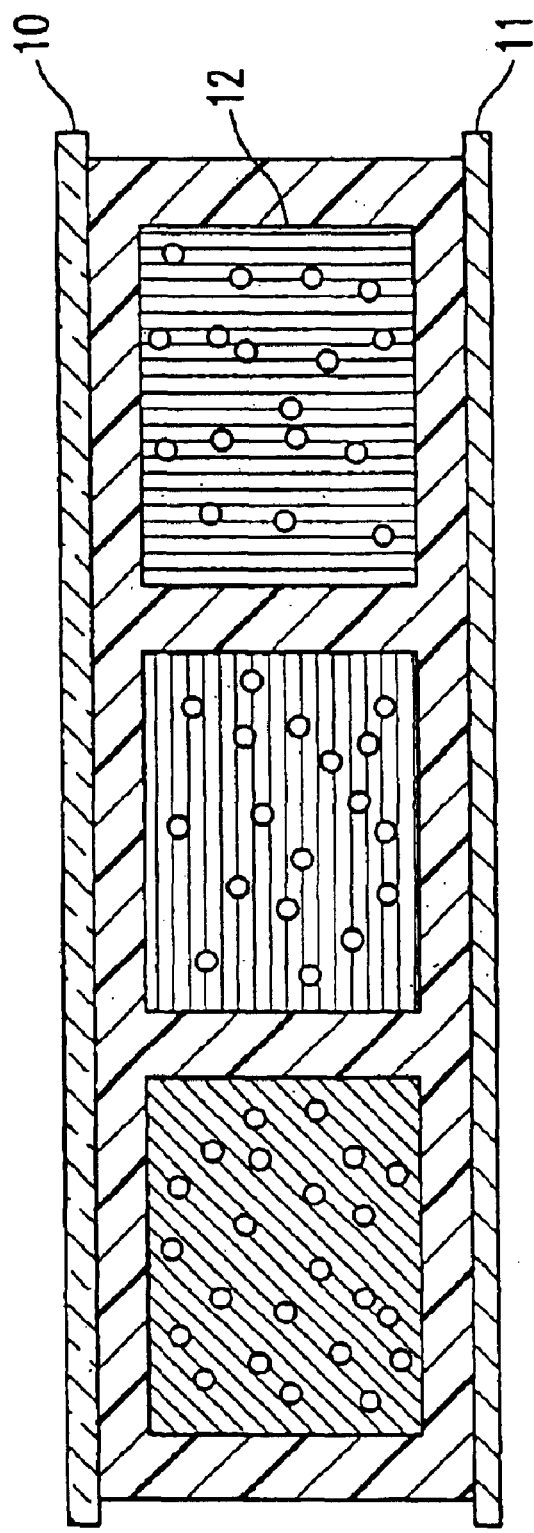
FIG. 1 is a schematic depiction of the electrophoretic display of the present invention.

An electrophoretic display of the present invention, as shown in FIG. 1, comprises two electrode plates (10, 11), at least one of which is transparent (10), and a layer of well-defined cells (12) enclosed between the two electrodes. The cells are of well-defined shape and size and are filled with charged pigment particles dispersed in a colored dielectric solvent. The cells are sealed with a sealing layer (not shown). When a voltage difference is imposed between the two electrodes, the charged particles migrate to one side, such that either the color of the pigment or the color of the solvent is seen through the transparent conductor film. At least one of the two conductors is patterned. The process for the preparation of such an electrophoretic display involves several aspects.

I. Preparation of the Microcups

I(a) Preparation of the Microcups by Embossing

Figure 2A:
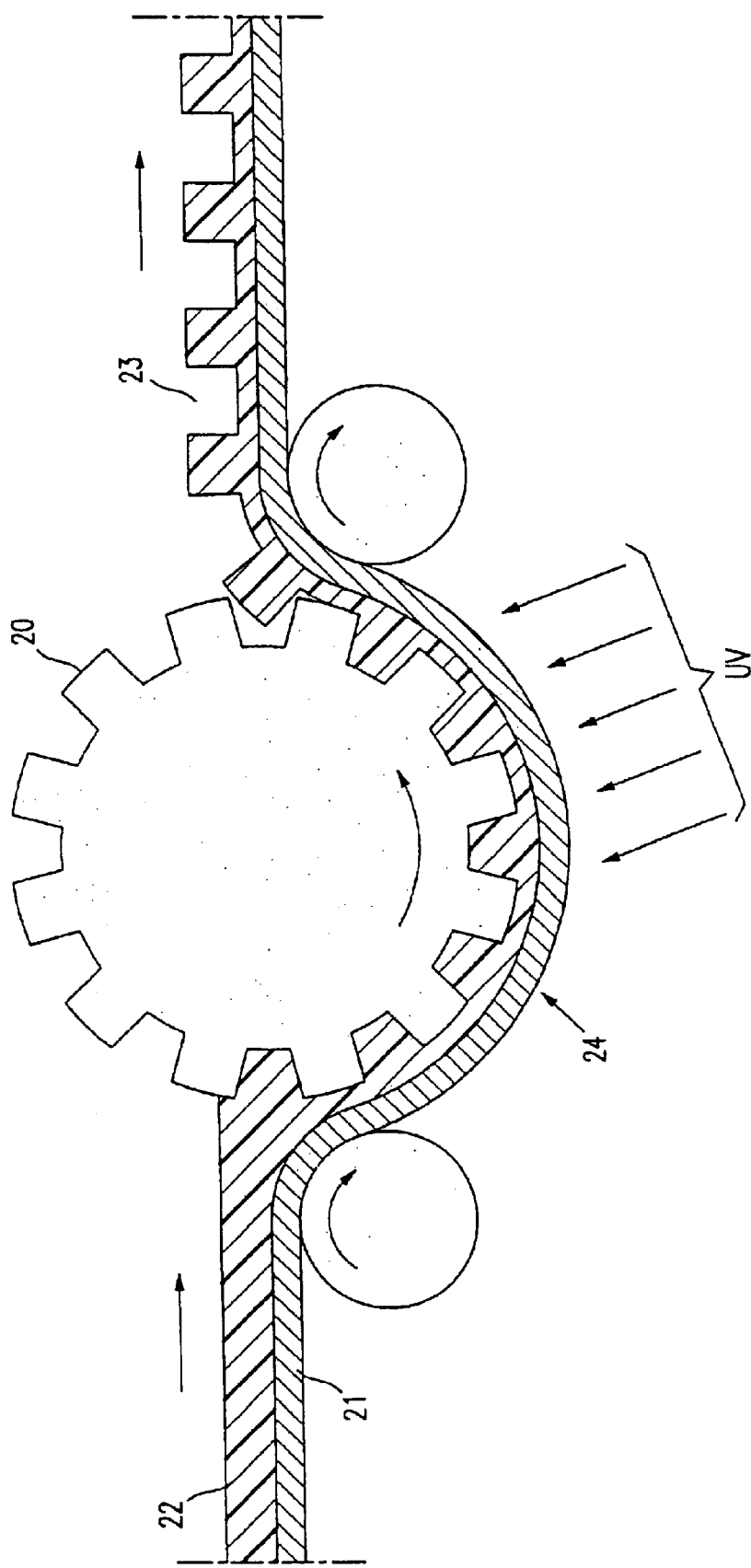
FIGS. 2a and 2b show the roll to roll process for the manufacture of an electrophoretic display, in particular, the creation of microcups by embossing a conductor film coated with a UV curable composition.
Figure 2B:
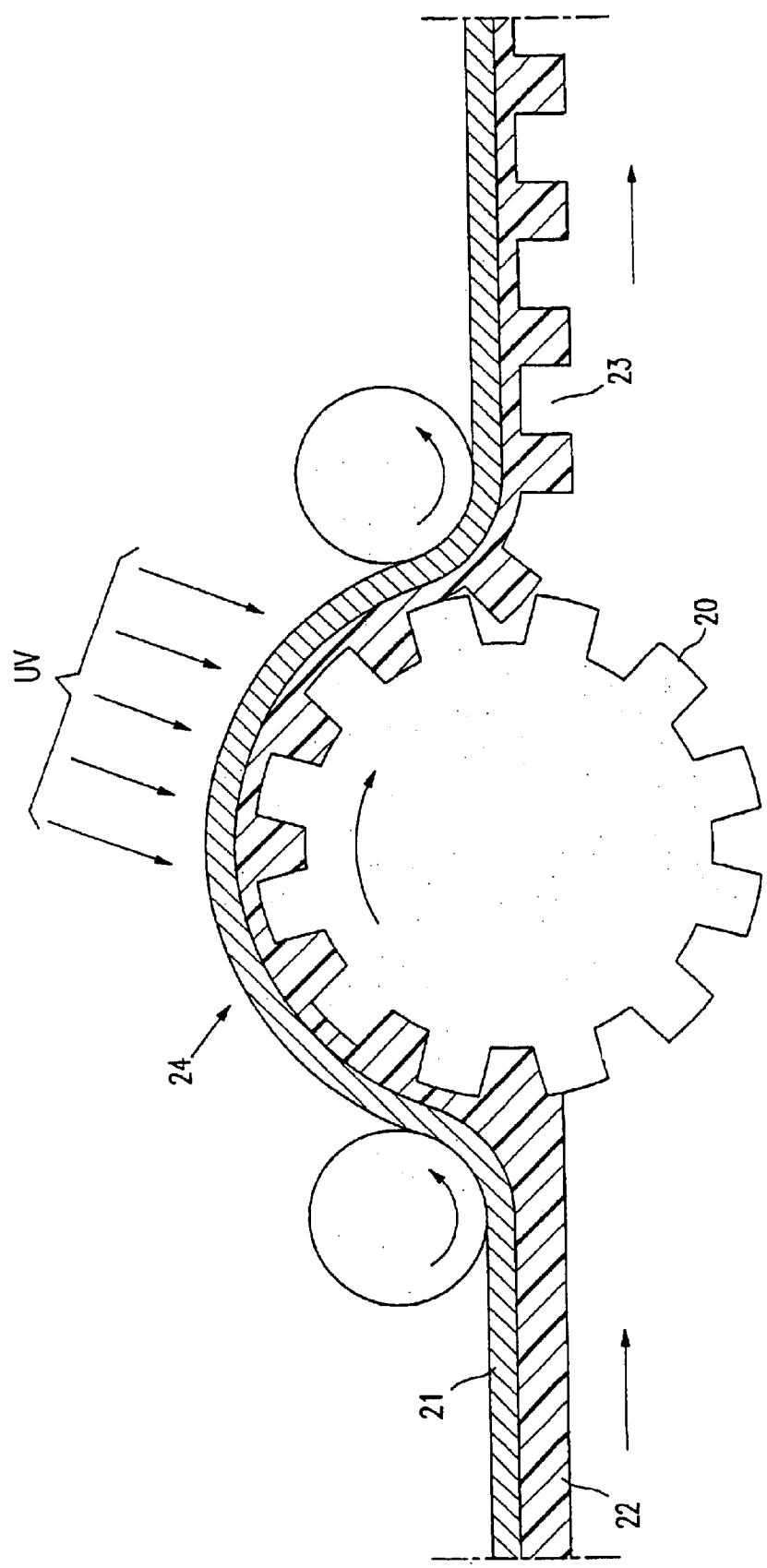

This processing step is shown in FIGS. 2a and 2b. The male mold (20) may be placed either above (FIG. 2a) or below (FIG. 2b) the web (24). The transparent conductive substrate is constructed by forming a transparent conductor film (21) on a glass plate or a plastic substrate. A layer of a thermoplastic or thermoset precursor (22) is then coated on the conductor film. The thermoplastic or thermoset precursor layer is embossed at a temperature higher than the glass transition temperature of the thermoplastic or thermoset precursor layer by the male mold in the form of a roller, plate or belt.

The thermoplastic or thermoset precursor for the preparation of the microcups may be multifunctional acrylate or methacrylate, vinylether, epoxide and their oligomers or polymers, and the like. Multifunctional acrylate and its oligomers are the most preferred. A combination of a multifunctional epoxide and a multifunctional acrylate is also very useful to achieve desirable physico-mechanical properties. A crosslinkable oligomer imparting flexibility, such as urethane acrylate or polyester acrylate, is usually also added to improve the flexure resistance of the embossed microcups. The composition may contain oligomer, monomer, additives and optionally a polymer. The glass transition temperatures (or Tg) for this class of materials usually range from about −70° C. to about 150° C., preferably from about −20° C. to about 50° C. The microembossing process is typically carried out at a temperature higher than the Tg. A heated male mold or a heated housing substrate against which the mold presses may be used to control the microembossing temperature and pressure.

As shown in FIGS. 2a and 2b, the mold is released during or after the precursor layer is hardened to reveal an array of microcups (23). The hardening of the precursor layer may be accomplished by cooling, cross-linking by radiation, heat or moisture. If the curing of the precursor layer is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the precursor layer.

Preparation of the Male Mold

Figure 3A:
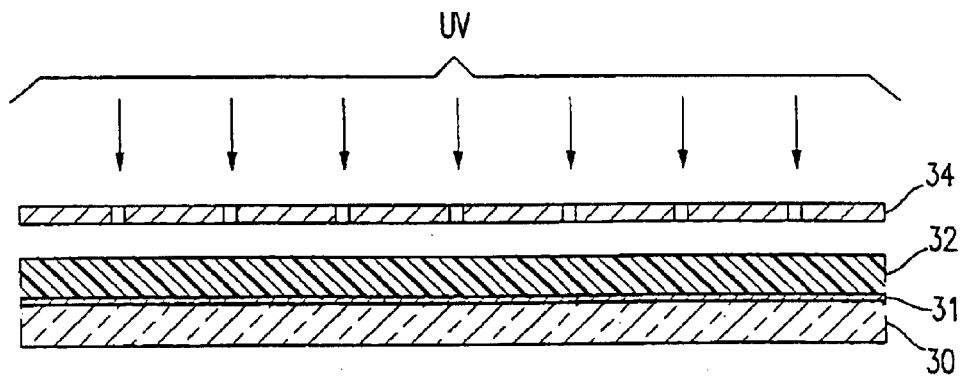
FIGS. 3a–3d illustrate a typical method of preparing the male mold for microembossing.
Figure 3B:
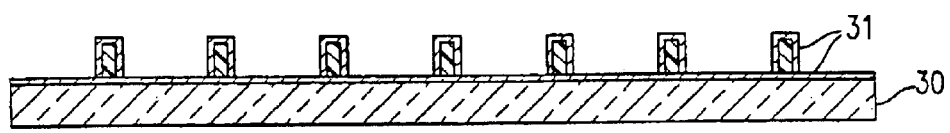
Figure 3C:
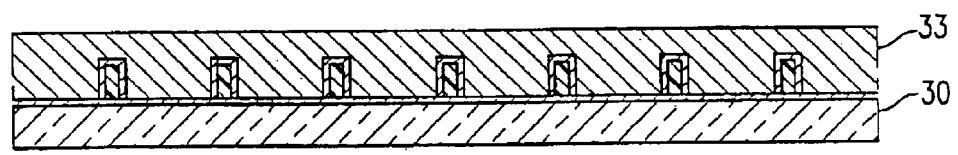
Figure 3D:
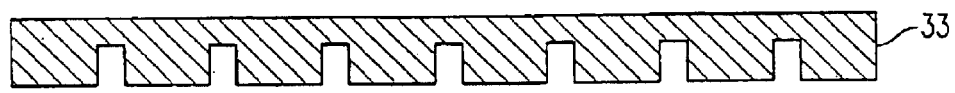

The male mold may be prepared by a diamond turn process or a photoresist process followed by either etching or electroplating. A representative example for the preparation of the male mold is given in FIG. 3. With electroplating (FIG. 3a), a glass base (30) is sputtered with a thin layer (typically 3000 Å) of a seed metal (31) such as chrome inconel. It is then coated with a layer of photoresist (32) and exposed to UV. A mask (34) is placed between the UV and the layer of photoresist (32). The exposed areas of the photoresist become hardened. The unexposed areas are then removed by washing with an appropriate solvent. The remaining hardened photoresist is dried and sputtered again with a thin layer of seed metal. A master (FIG. 3b) is then ready for electroforming. A typical material used for electroforming is nickel cobalt (33). Alternatively, the master can be made of nickel by nickel sulfamate electroforming or electroless nickel deposition as described in "Continuous Manufacturing of Thin Cover Sheet Optical Media", *SPIE*

*Proc.* 1663:324 (1992). The floor of the mold (FIG. 3d) is typically between 50 to 400 microns. The master can also be made using other microengineering techniques including e-beam writing, dry etching, chemical etching, laser writing or laser interference as described in "Replication Techniques for Micro-optics", *SPIE Proc.* 3099:76–82 (1997). Alternatively, the mold can be made by photomachining using plastics, ceramics or metals.

Figure 4B:
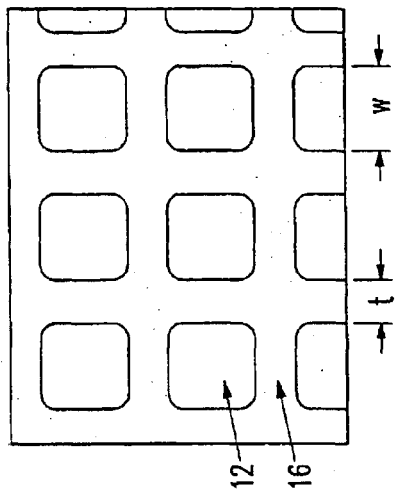
FIGS. 4a–4c show a typical microcup array prepared by microembossing.
Figure 4A:
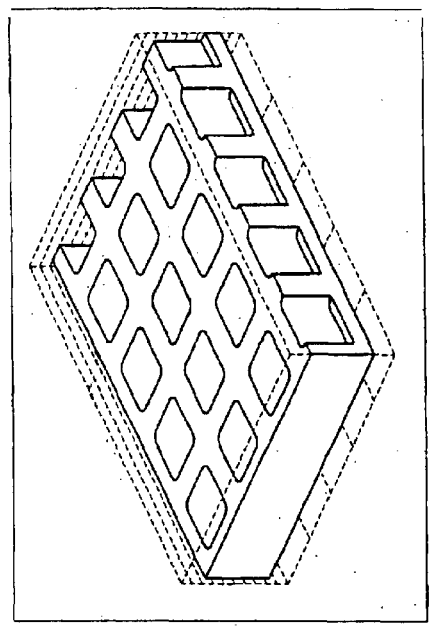
Figure 4C:
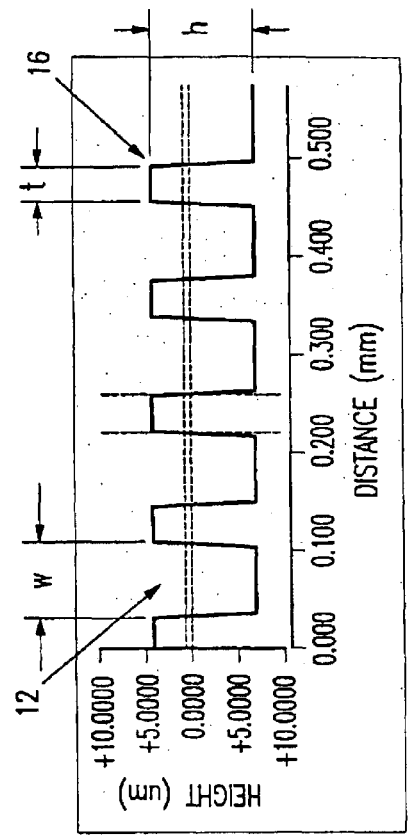

FIG. 4a is an optical profilometry three-dimensional profile of the typical microcups prepared by microembossing. FIG. 4b is an optical microscopic picture showing the openings of the microcups from the top view. FIG. 4c is the optical profilometry vertical cross-section view of a row of microcups showing their depth.

I(b) Preparation of the Microcups by Imagewise Exposure

Alternatively, the microcups may be prepared by imagewise exposure (FIG. 5a) of a radiation curable material (51) coated on the conductor film (52) to UV or other forms of radiation through a mask (50). The conductor film (52) is on a plastic substrate (53).

For a roll-to-roll process, the photomask may be synchronized with the web and move at the same speed as the latter. In the photomask (50) in FIG. 5a, the dark squares (54) represent the opaque area and the space (55) between the dark squares represents the opening area. The UV radiates through the opening area (55) onto the radiation curable material. The exposed areas become hardened and the unexposed areas (protected by the opaque area in the mask) are then removed by an appropriate solvent or developer to form the microcups (56). The solvent or developer is selected from those commonly used for dissolving or reducing the viscosity of radiation curable materials such as methylethylketone, toluene, acetone, isopropanol or the like.

FIGS. 5b and 5c illustrate two other options for the preparation of microcups by imagewise exposure. The features in these two figures are essentially the same as shown in FIG. 5a and the corresponding parts are also numbered the same. In FIG. 5b, the conductor film (52) used is opaque and pre-patterned. In this case, it may be advantageous to imagewise expose the radiation sensitive material through the conductor pattern which serves as the photomask. The microcups (56) can then be formed by removing the unexposed areas after UV radiation. In FIG. 5c, the conductor film (52) is also opaque and line-patterned. The radiation curable material is exposed from the bottom through the conductor line pattern (52) which serves as the first photomask. A second exposure is performed from the other side through the second photomask (50) having a line pattern perpendicular to the conductor lines. The unexposed area is then removed by a solvent or developer to reveal the microcups (56).

I(c) Alternative Method for Preparation of Microcups

In addition to the methods described in Sections I(a) and (b) above, the microcups may also be prepared by laminating a spacer film with an array of prepunched holes onto a conductor film. Suitable spacer film materials for having prepunched holes include thermoset or thermoplastic resins such as polyethylene terephthalate (PET), polyethylene naphthalate (PEN), polycarbonate, polymethyl methacrylate (PMMA), polysulfone, polystyrene, polyurethane, polysiloxanes, epoxy resins, polyolefins, polycycloolefins, polyamides, polyimides, cured vinyl esters, cured unsaturated polyesters, cured multifunctional vinyl ethers, cured multifunctional acrylates, cured multifunctional allyls and their copolymers. The spacer film may be clear, opaque or colored. The lamination of the film may be accomplished by using an adhesive, such as a pressure sensitive adhesive, a hot melt adhesive, a heat, moisture or radiation curable adhesive. Alternatively, the pre-punched spacer film may be laminated onto the conductor film by heat or by using a suitable solvent for the spacer film, followed by drying. Examples of suitable solvents include THF, acetone, methylethylketone, cyclohexanone, ethyl acetate and their derivatives and these solvents are particularly useful for PMMA and polycarbonates.

In general, the microcups can be of any shape, and their sizes and shapes may vary. The microcups may be of substantially uniform size and shape in one system. However, in order to maximize the optical effect, microcups having a mixture of different shapes and sizes may be produced. For example, microcups filled with a dispersion of the red color may have a different shape or size from the green microcups or the blue microcups. Furthermore, a pixel may consist of different numbers of microcups of different colors. For example, a pixel may consist of a number of small green microcups, a number of large red microcups, and a number of small blue microcups. It is not necessary to have the same shape and number for the three colors.

The openings of the microcups may be round, square, rectangular, hexagonal, or any other shape. The partition area between the openings is preferably kept small in order to achieve high color saturation and contrast while maintaining desirable mechanical properties. Consequently, the honeycomb-shaped opening is preferred over, for example, the circular opening.

For reflective electrophoretic displays, the dimension of each individual microcup may be in the range of about $1 \times 10^2$ to about $1 \times 10^6$ $\mu m^2$, preferably from about $1 \times 10^3$ to about $1 \times 10^5$ $\mu m^2$. The depth of the microcups is in the range of about 5 to about 200 microns, preferably from about 10 to about 100 microns. The opening to the total area ratio is in the range of from about 0.05 to about 0.95, preferably from about 0.4 to about 0.9.

II. Preparation of the Suspension/Dispersion

The suspensions filled in the microcups comprise a dielectric solvent with charged pigment particles dispersed therein and the particles migrate under the influence of an electric field. The suspensions may optionally contain additional contrasting colorants which may or may not migrate in the electric field. The dispersion may be prepared according to methods well known in the art such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices,* 24:827 (1977), and *J. Appl. Phys.* 49(9):4820 (1978). The charged pigment particles visually contrast with the medium in which the particles are suspended. The medium is a dielectric solvent which preferably has a low viscosity and a dielectric constant in the range of about 1 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. In one preferred embodiment, poly (chlorotrifluoroethylene) is used as the dielectric solvent. In another preferred embodiment, poly(perfluoropropylene oxide) is used as the dielectric solvent.

The contrasting colorant may be dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthraquinone blue, anthraquinone yellow 114, anthraquinone red 111, 135, anthraquinone green 28 from Aldrich. In case of a contrasting color pigment, the color pigment particles may also be dispersed in the dielectric medium. These color particles are preferably uncharged. If the contrasting color pigment particles are charged, they preferably carry a charge which is opposite from that of the charged primary pigment particles. If both types of pigment particles carry the same charge, then they should have different charge density or different electrophoretic mobility. In any case, the dye or pigment used in the display must be chemically stable and compatible with other components in the suspension.

The charged primary pigment particles are preferably white, and may be organic or inorganic pigments, such as $TiO_2$. If colored pigment particles are used, they may be formed from organic or inorganic pigments, such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher. Particle size is preferably in the range of about 0.01 to about 5 microns, and is even more preferably in the range of about 0.05 to about 2 microns. The particles should have acceptable optical characteristics, should not be swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex from International Specialty Products), (meth)acrylic acid copolymers, N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For a black/white electrophoretic display, the suspension may comprise charged white particles of titanium oxide ($TiO_2$) dispersed in a blackened dielectric solvent. A black dye or dye mixture such as Pylam Spirit Black and Fast Spirit Black from Pylam Products Co. Arizona, Sudan Black B from Aldrich, Thermoplastic Black X-70 from BASF, or an insoluble black pigment such as carbon black may be used to generate the black color of the solvent. For other colored suspensions, there are many possibilities. For a subtractive color system, the charged $TiO_2$ particles may be suspended in a dielectric solvent of cyan, yellow or magenta color. The cyan, yellow or magenta color may be generated via the use of a dye or a pigment. For an additive color system, the charged $TiO_2$ particles may be suspended in a dielectric solvent of red, green or blue color generated also via the use of a dye or a pigment. The red, green, blue color system is preferred for most display applications.

III. Sealing of the Microcups

The sealing of the microcups may be accomplished in a number of ways. A preferred approach is to disperse a UV curable composition into an electrophoretic fluid containing charged pigment particles dispersed in a colored dielectric solvent. The UV curable composition is immiscible with the dielectric solvent and has a specific gravity lower than that of the dielectric solvent and the pigment particles. The two components, UV curable composition and the electrophoretic fluid, are thoroughly blended in an in-line mixer and immediately coated onto the microcups with a precision coating mechanism such as Myrad bar, gravure, doctor blade, slot coating or slit coating. Excess fluid is removed by a wiper blade or a similar device. A small amount of a weak solvent or solvent mixture such as isopropanol, methanol or an aqueous solution thereof may be used to clean the residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be sealed by curing the supernatant UV curable layer during or after it floats to the top. UV or other forms of radiation such as visible light, IR and electron beam may be used to cure and seal the microcups. Alternatively, heat or moisture may also be employed to cure and seal the microcups. If appropriate, heat or moisture curable compositions may be used.

The UV curable composition may comprise a thermoplastic or thermoset precursor such as hydrocarbon rubbers, butadiene rubbers, isoprene rubbers, thermoplastic elastomers, polyvalent acrylates or methacrylates, cyanoacrylates, polyvalent vinyls (such as polyvalent vinylbenzene, polyvalent vinylsilane or polyvalent vinylether), polyvalent epoxides, polyvalent isocyanates, polyvalent allyls, oligomers and polymers containing crosslinkable functional groups, or the like.

A preferred group of dielectric solvents exhibiting desirable density and solubility discrimination against acrylate monomers and oligomers are halogenated hydrocarbons particularly perfluorinated solvents and their derivatives. Surfactants may be used to improve the adhesion and wetting at the interface between the electrophoretic fluid and the sealing materials.

Useful surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the sealing precursor may be coated sequentially into the microcups, particularly when the sealing precursor is at least partially compatible with the dielectric solvent. Thus, the sealing of the microcups may be accomplished by overcoating a thin layer of a thermoplastic or thermoset precursor which is curable by radiation, heat, moisture or interfacial reaction and curing on the surface of the filled microcups. Volatile organic solvents may be used to adjust the viscosity and the thickness of the coatings. When a volatile solvent is used in the overcoat, it is preferred that it is immiscible with the dielectric solvent.

Interfacial polymerization followed by UV curing is very beneficial to the sealing process. Intermixing between the electrophoretic layer and the overcoat is significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is significantly lower than that of the electrophoretic fluid. The two-step overcoating process is particularly useful when the dye used is at least partially soluble in the sealing material.

IV. Preparation of Monochrome Electrophoretic Displays

Figure 6:
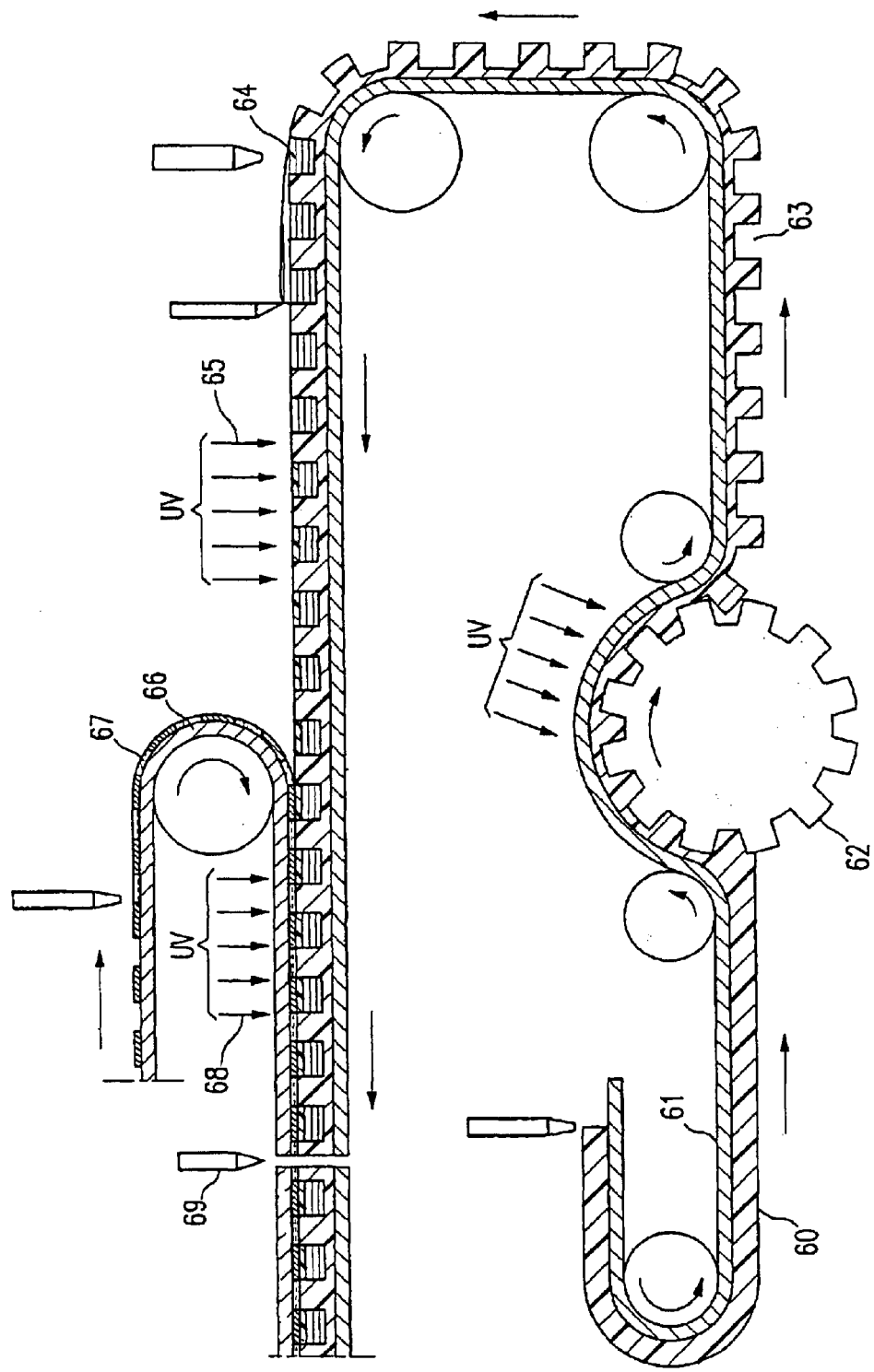
FIG. 6 is a flow chart for manufacturing a black/white electrophoretic display or other single color electrophoretic displays.

The process is illustrated by the flow diagram as shown in FIG. 6. All microcups are filled with a suspension of the same color composition. The process can be a continuous roll-to-roll process comprising the following steps:

1. Coat a layer of thermoplastic or thermoset precursor (60) optionally with a solvent on a continuous web (61). The solvent, if present, readily evaporates. Depending on the switching mode of the display, the continuous web (61) may be a plastic substrate, a patterned or non-patterned conductor film on a plastic substrate.

2. Emboss the thermoplastic or thermoset precursor layer at a temperature higher than the glass transition temperature of the precursor layer by a pre-patterned male mold (62).

3. Release the mold from the thermoplastic or thermoset precursor layer preferably during or after it is hardened by proper means.

4. Fill the thus-formed array of microcups (63) with a dispersion (64) of charged pigment particles in a dielectric solvent containing at least a thermoplastic or thermoset precursor which is incompatible with the solvent and has a lower specific gravity than the solvent and the pigment particles.

5. Seal the microcups by curing the precursor layer preferably by radiation such as UV (65), or by heat or moisture during or after the precursor layer separates and forms a supernatant layer on top of the liquid phase, thus forming closed electrophoretic cells containing a pigment dispersion in a dielectric solvent.

6. Laminate the sealed array of electrophoretic cells with a second conductor film (66) pre-coated with an adhesive layer (67) which may be a pressure sensitive adhesive, a hot melt adhesive, a heat, moisture, or radiation curable adhesive.

The laminate adhesive may be post cured by radiation such as UV (68) through either side of the web. The finished product may be cut (69) after the lamination step. Alternatively, the sealed microcups may be cut to an appropriate size before the lamination step.

The preparation of the microcups described above can be conveniently replaced by the alternative method of using a spacer film having pre-punched holes or by imagewise exposing the conductor film coated with a radiation curable material followed by removing the unexposed areas by an appropriate solvent. The sealing of the microcups may alternatively be accomplished by directly overcoating and hardening the sealing composition over the surface of the electrophoretic fluid.

V. Preparation of Multi-Color Electrophoretic Displays

For the manufacture of a multi-color electrophoretic display, additional steps are needed to generate microcups containing suspensions of different colors. These additional steps include (1) laminating the already formed microcups with a positively working dry-film photoresist consisting of at least a removable support such as PET-4851 from Saint-Gobain, Worcester, Mass., a novolac positive photoresist such as Microposit S1818 from Shipley, and an alkali-developable adhesive layer such as a mixture of Nacor 72-8685 from National Starch and Carboset 515 from BF Goodrich; (2) selectively opening a certain amount of the microcups by imagewise exposing the photoresist, removing the removable support film, and developing the positive photoresist with a developer such as diluted Microposit 351 developer from Shipley; (3) filling the opened microcups with an electrophoretic fluid containing charged pigment ($TiO_2$) particles and dye or pigment of a first color; and (4) sealing the filled microcups as described in Section III above. These additional steps may be repeated to create microcups filled with electrophoretic fluids of second and the third colors.

More specifically, a multi-color electrophoretic displays may be prepared according to the steps as shown in FIG. 7:

1. Coat a layer of thermoplastic or thermoset precursor (70) on a conductor film (71).

2. Emboss the thermoplastic or thermoset precursor layer at a temperature higher than its glass transition temperature by a pre-patterned male mold (not shown).

3. Release the mold from the thermoplastic or thermoset precursor layer preferably during or after it is hardened by cooling or crosslinking by radiation, heat or moisture.

4. Laminate the thus formed array of microcups (72) with a positive dry-film photoresist which comprises at least an adhesive layer (73), a positive photoresist (74) and a removable plastic cover sheet (not shown).

Figure 7A:
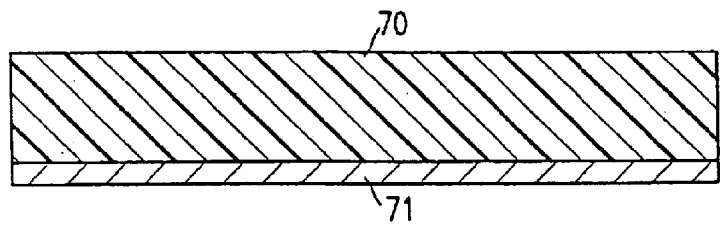
FIGS. 7a–7h are a flow chart for manufacturing a multicolor electrophoretic display.
Figure 7B:
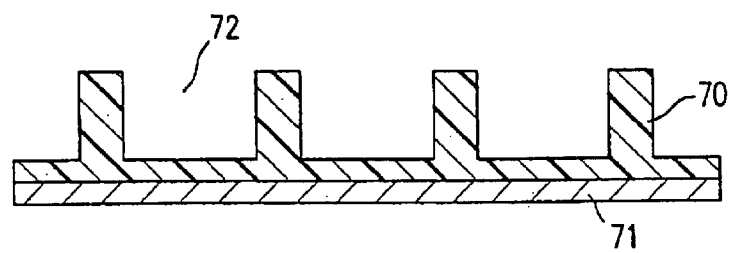
Figure 7C:
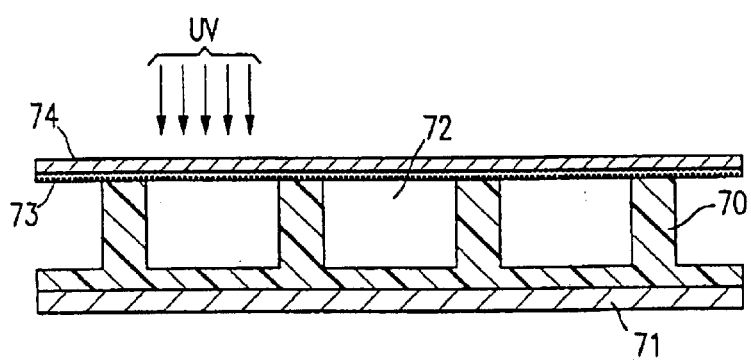
Figure 7D:
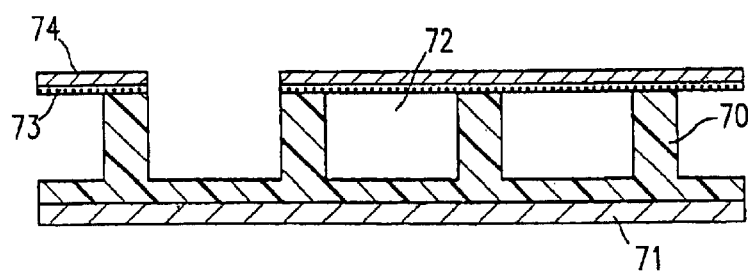

5. Imagewise expose (FIG. 7*c*) the positive photoresist by UV, visible light, or other radiation, remove the cover sheet, develop and open microcups in the exposed area. The purpose of Steps 4 and 5 is to selectively open the microcups in a predetermined area (FIG. 7*d*).

6. Fill the opened microcups with a charged pigment dispersion (75) in a dielectric solvent containing at least a dye or pigment of a first color and a thermoplastic or thermoset precursor (76) which is incompatible with the solvent and has a lower specific gravity than the solvent and the pigment particles.

Figure 7E:
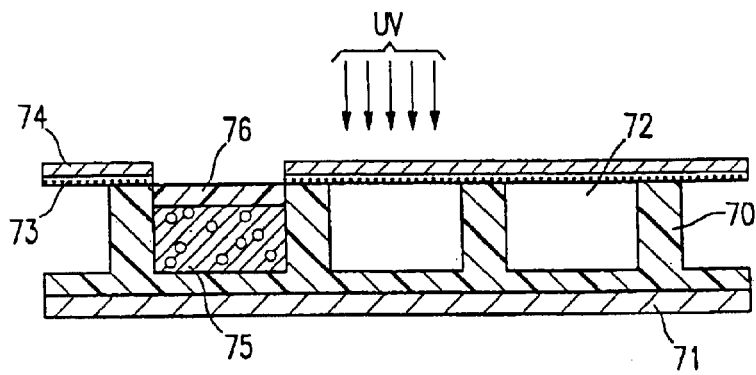

7. Seal the microcups to form closed electrophoretic cells containing electrophoretic fluid of the first color by curing the precursor layer (preferably by radiation such as UV, less preferably by heat or moisture) during or after the precursor layer separates and forms a supernatant layer on top of the liquid phase (FIG. 7*e*).

Figure 7F:
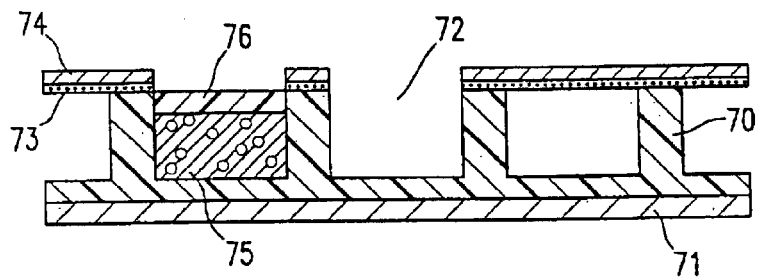
Figure 7G:
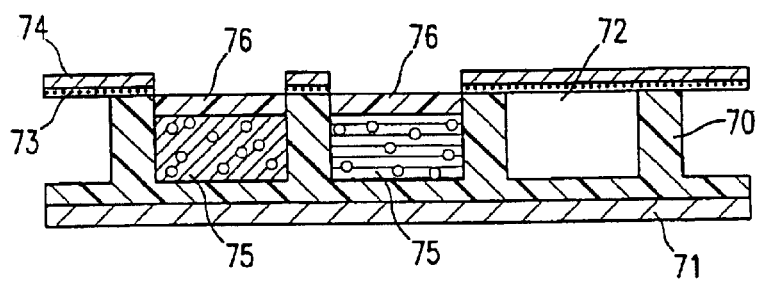
Figure 7H:
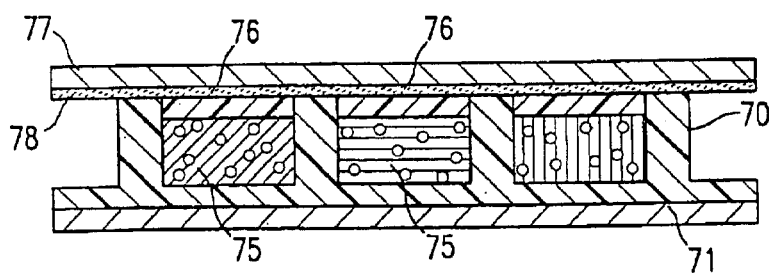

8. Steps 5–7 described above may be repeated to generate well-defined cells containing electrophoretic fluids of different colors in different areas (FIGS. 7e, 7f and 7g).

9. Laminate the sealed array of electrophoretic cells in registration to a second, pre-patterned transparent conductor film (77) pre-coated with an adhesive layer (78) which may be a pressure sensitive adhesive, a hot melt adhesive, a heat, moisture, or radiation curable adhesive.

10. Harden the adhesive.

The preparation of the microcups described in the process above can conveniently be replaced by the alternative procedure of imagewise exposing the conductor film coated with a radiation curable material followed by removing the unexposed areas by an appropriate solvent or using a spacer film with prepunched holes. The sealing of the microcups may be alternatively accomplished by directly coating a layer of sealing material over the surface of the liquid phase.

VI. Alternative Process for the Preparation of Electrophoretic Displays

Figure 8:
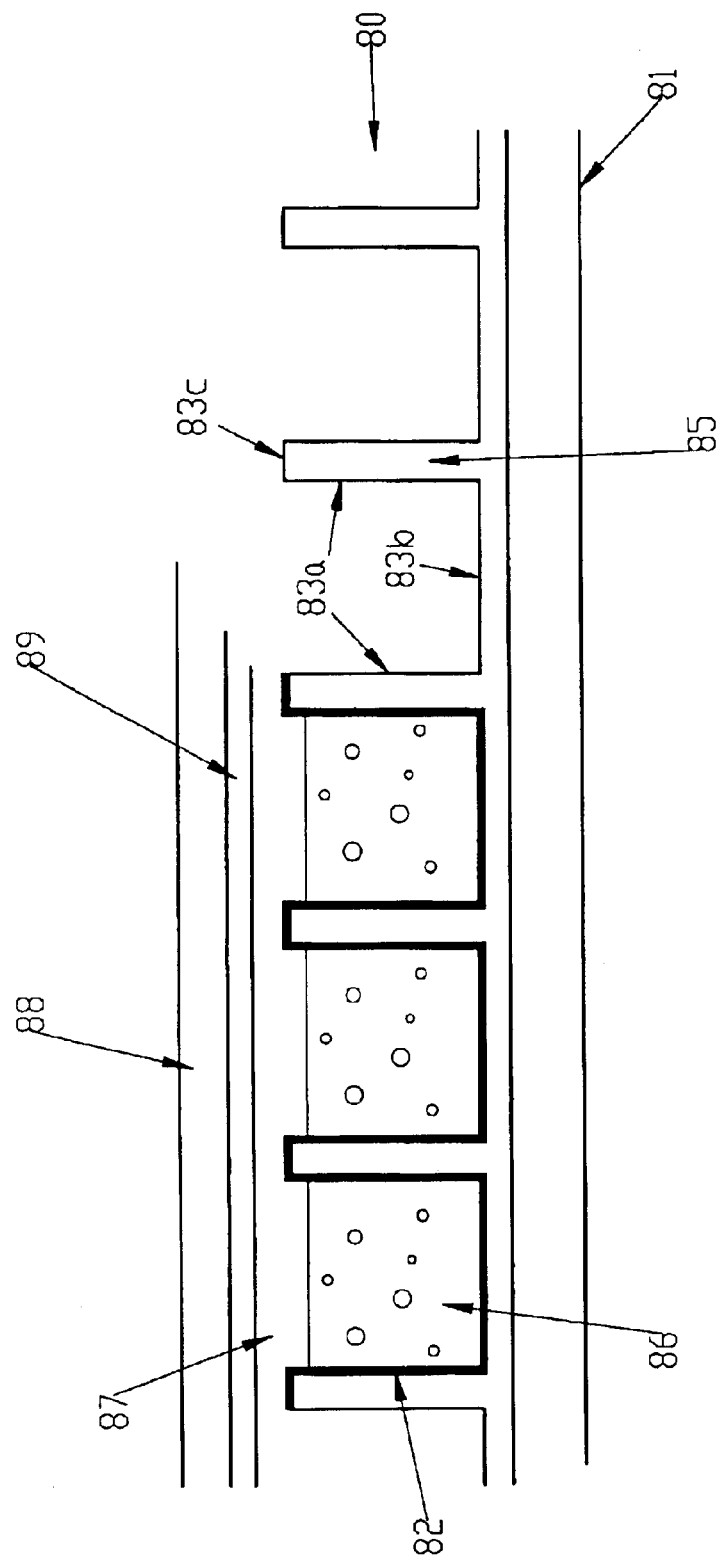
FIG. 8 illustrate an electrophoretic display prepared by an alternative method involving coating the surface of microcups with a conductor layer.

FIG. 8 illustrates an electrophoretic display prepared by an alternative process. In this process, an array of microcups (80) are formed directly on a first non-conducting substrate (81). Useful non-conducting substrates may include, but are not limited to, glass, metal sheets or films overcoated or laminated with a non-conducting or dielectric layer, and plastic films such as epoxy resins, polyimide, polysulfone, polyarylether, polycarbonate (PC), polyethylene terephthalate (PET), polyethylene terenaphthalate (PEN), poly(cyclic olefin) and composites thereof.

The microcups may be formed by any of the methods as described in Section I. After the formation of the microcups, a first conductor layer (82) is formed on the surface (83) of the microcups which includes the side surface (83a), the bottom surface (83b) and the top surface (83c) of the partition walls (85). In one embodiment, the first conductor layer may be formed on only the side surface (83a) and the bottom surface (83b). In another embodiment, the first conducting layer may be formed on the side surface (83a), bottom surface (83b) and the top surface (83c) of the partition walls and in this case the first conducting layer on the top surface (83c) of the partition walls may be later removed.

The first conductor film may be formed on the surface of the microcups by electroless plating, sputtering, vacuum deposition or a combination thereof. Useful conductor films may include, but are not limited to, metal conductors such as aluminum, copper, zinc, tin, molybdenum, nickel, chromium, silver, gold, iron, indium, thallium, titanium, tantalum, tungsten, rhodium, palladium, platinum or cobalt, and the like, and metal oxide conductors such as indium tin oxide (ITO) or indium zinc oxide (IZO), as well as alloys or multilayer composite films derived from the aforementioned metals and/or metal oxides. Further, the conductor layer described herein may comprise either a single layer thin film or a multilayer thin film. ITO films are of particularly interest in many applications because of their high degree of transmission in the visible light region.

The patterning of the first conductor film may be accomplished by, for example, a photolithographic process which comprises steps including (i) coating the conductor film with a photoresist, (ii) patterning the photoresist by imagewise exposing it through a photomask to, for example, ultraviolet light, (iii) "developing" the patterned image by removing the photoresist from either the exposed or the unexposed areas, depending on the type of photoresist used, to uncover the conductor film in areas from which it is to be removed (i.e., areas where no electrode lines are to be located), (iv) using a chemical etching process to remove the conductor film from the areas from which the photoresist has been removed and (v) stripping the remaining photoresist to uncover the electrode lines.

Alternatively, the photoresist may be printed onto the first conductor film followed by etching and stripping to reveal the conductor pattern.

Still alternatively, the conductor film may be patterned by dry etching using laser or by laminating an adhesive tape on the microcup surface and peeling off the conductor film on selective areas of the surface.

Still alternatively, the first conductor layer may be patterned by printing a masking layer on the microcup surface followed by depositing a conductor layer by, for example, vapor deposition or sputtering. More specifically, the formation of the first conducting film on the microcup surface may be accomplished by first printing on the surface a strippable printing material. The printed strippable material defines an area on the surface where the conductive film structure is not to be formed. In other words, the printed strippable material is substantially not present in the area on the surface where the conductive film structure is to be formed. A thin layer of a conductive material is then deposited on the patterned surface, followed by stripping the strippable material from the surface, whereby the strippable material and any conductive material formed thereon are removed leaving behind a patterned conductive film structure. Alternatively, the formation of a patterned conductive film structure on the microcup surface may be accomplished by first printing a printable material on the surface that defines an area where the conductive film structure is to be formed. A conductive thin film is then deposited on the microcup surface. In this case, the conductive film adheres more strongly to the printable material than to the surface without the printable material. After stripping off the conductive film formed directly on the surface using a stripping process that does not strip the conductive film from the printable material, the conductive film structure remains formed on the printable material used to define the area in which the conductive film structure is to be formed. These methods are disclosed in a co-pending application, U.S. application Ser. No. 10/422,557 filed Apr. 23, 2003 (corresponding to WO03/091788), the content of which is incorporated herein by reference in its entirety.

The first conducting layer deposited, particularly that on the top surface of the partition walls, may be selectively removed or patterned by, for example, (1) photolithographic exposure followed by etching and stripping, (2) laser dry etching or (3) laminating the conductor/microcup/substrate structure with an adhesive tape followed by mechanically peeling off the conductor film on the top surface of partition walls.

After the first conductor film is formed on the surface of the microcups, the microcups may then be filled with an electrophoretic fluid (86) and sealed with a sealing layer (87) as described in sections above. Optionally, an electrode protective layer may be coated onto the first conductive layer before the filling and sealing of the electrophoretic fluid.

The filled and sealed microcup array is then laminated with a second conductor layer (88) optionally with an adhesive layer (89) as described above. If the second conduct film is deposited by, for example, thin film sputtering or vapor deposition, a second non-conducting substrate layer may be laminated onto the second conductor film, optionally with an adhesive layer.

The first conducting layer (82) has a thickness in the range of 1 nm to 3000 nm, preferably in the range of 20 nm to 500 nm, more preferably in the range of 50 nm to 150 nm.

There may be a third conductive layer (not shown) between the microcup array (80) and the first non-conducting substrate (81), particularly when a discrete conductor pattern is formed on the microcup structure. The first conductor film may be of a discrete pattern (i.e., not connected) by, for example, removing the conductor layer on the top surface of the partition walls.

The second and third conductive layers independently may also be patterned by any of the methods described above.

In one embodiment, the first conductor layer may be disposed onto the surface of the microcups by thin film deposition (e.g., sputtering or vapor deposition). In another embodiment, the second conductor layer may be formed on the filled and sealed microcups by thin film deposition or lamination. In a further embodiment, the third conductor layer, if present, may be formed on the first non-conducting substrate by thin film deposition or lamination and the microcups are formed on the third conductor layer.

This alternative design is also suitable for monochrome and multi-color displays which may be prepared by the methods described in this section in combination with the methods as described in Section IV or Section V, respectively.

While the term "microcup" is used in this section, it is understood that the concept of this alternative design is applicable to all electrophoretic displays having display cells. The first conductor layer described above may be formed on the surface of the display cells which corresponds to surface (83a, 83b and 83c) of the microcups.

The thickness of the electrophoretic display produced by any of the processes as described in this application can be as thin as a piece of paper. The width of the display is the width of the coating web (typically 1–90 inches). The length of the display can be anywhere from inches to thousands of feet depending on the size of the roll.

EXAMPLES

The following examples are given to enable those skilled in the art to more clearly understand and to practice the present invention. They should not be considered as limiting the scope of the invention, but merely as being illustrative and representative thereof.

Example 1

Preparation of Microcups by Microembossing

The composition shown in Table 1 is coated onto Mylar J101/200 gauge using a Nickel Chrome bird type film applicator with an opening of 3 mil. The solvent is allowed to evaporate leaving behind a tacky film with a Tg below room temperature.

TABLE 1

PMMA-containing Composition for Microembossing

| No. | Description | Ingredient | Supplier | Wt % |
|---|---|---|---|---|
| 1 | Epoxy acrylate | Ebecryl 3605 | UCB Chemicals | 7.35 |
| 2 | Monomer | Sartomer SR205 | Sartomer | 9.59 |
| 3 | Urethane acrylate | Ebecryl 6700 | UCB Chemicals | 4.87 |
| 4 | Polymethyl-methacrylate | Elvacite 2051 | ICI | 9.11 |
| 5 | Photoinitiator | Darocur 1173 | Ciba | 1.45 |

TABLE 1-continued

PMMA-containing Composition for Microembossing

| No. | Description | Ingredient | Supplier | Wt % |
|---|---|---|---|---|
| 6 | Cationic photoinitiator | Cyracure UVI 6976 | Union Carbide | 0.60 |
| 7 | Solvent | Acetone | Aldrich | 67.03 |
| | | Total | | 100.00 |

A pre-patterned stencil from Photo Stencil, Colorado Springs, Colo., was used as the male mold for microembossing and Frekote 700-NC from Henkel was used as the mold release. The coated film was then embossed by the stencil using a pressure roller at room temperature. The coating was then UV cured for about 20 minutes through the Mylar film using a Loctite Zeta 7410 exposure unit equipped with a metal fluoride lamp with an intensity of 80 mW/cm$^2$ at 365 nm. The embossed film was then released from the mold to reveal well-defined microcups having lateral dimensions ranging from 60 μm to 120 μm (200–400 dpi) and a depth ranging from 5 μm to 30 μm as measured by optical profilometry and microscope (FIGS. 4a–4c).

Example 2

A composition containing solid oligomer, monomer and additive is shown in Table 2. The glass transition temperature of the mixture is again below room temperature. The tacky coating is deposited on top of Mylar J101/200 gauge as before. Embossing can be conducted at 32° C. and 60° C. using a heated pressure roller or laminator. Well-defined high resolution microcups (100–400 dpi) with depth ranging from 5–30 microns were produced.

TABLE 2

Embossing Composition

| No. | Description | Ingredient | Supplier | Wt % |
|---|---|---|---|---|
| 1 | Epoxy acrylate | Ebecryl 3903 | UCB Chemicals | 17.21 |
| 2 | Monomer | HDODA | UCB Chemicals | 8.61 |
| 3 | Urethane acrylate | Ebecryl 4827 | UCB Chemicals | 2.87 |
| 4 | Photoinitiator | Irgacure 500 | Ciba | 1.43 |
| 5 | Slip | Ebecryl 1360 | UCB Chemicals | 1.60 |
| 6 | Solvent | Acetone | Aldrich | 68.26 |
| | | Total | | 100 |

Example 3

A primer solution comprising of 5 parts of Ebecryl 830, 2.6 parts of SR-399 (from Sartomer), 1.8 parts of Ebecry 1701, 1 part of PMMA (Mw=350,000 from Aldrich), 0.5 parts of Irgacure 500 and 40 parts of methyl ethyl ketone (MEK) was coated onto a 2 mil 60 ohm/sq. ITO/PET film (from Sheldahl Inc., MN.) using a #3 Myrad bar, dried, and UV cured by using the Zeta 7410 (5 w/cm$^2$, from Loctite) exposure unit for 15 minutes in air.

35 Parts by weight of Ebecryl 600 (UCB), 40 parts of SR-399 (Sartomer), 10 parts of Ebecryl 4827 (UCB), 7 parts of Ebecryl 1360 (UCB), 8 parts of HDDA (UCB), 0.05 parts of Irgacure 369 (Ciba Specialty Chemicals) and 0.01 parts of isopropyl thioxanthone (ITX from Aldrich) were mixed homogeneously, coated onto the primer treated ITO/PET film with a targeted thickness of about 50 μm, and embossed with a Ni—Co male mold having a 60 (length)×60 (width)

μm repetitive protrusion square pattern with 25–50 μm protrusion height and 10 μm wide partition lines, UV cured from the PET side for 20 seconds, removed from the mold with a 2" peeling bar at a speed of about 4–5 ft/min. Well-defined micro-cups with depth ranging from 25 to 50 μm were prepared by using male molds having corresponding protrusion heights. Microcup arrays of various dimensions such as 70 (length)×70 (width)×35(depth)×10 (partition), 100 (length)×100(width)×35(depth)33 10(partition), and 100 (length)×100(width)×30(depth)×10 (partition) μm were also prepared by the same procedure.

Example 4

Preparation of Pigment Dispersion in Dielectric Solvent

Polystyrene (0.89 grams, Polysciences, Inc., Mw. 50,000) and AOT (0.094 grams, American Cyanamide, sodium dioctylsulfosuccinate) were dissolved in 17.77 grams of hot xylene (Aldrich). Ti-Pure R-706 (6.25 grams) was added to the solution and ground in an attritor at 200 rpm for more than 12 hours. A low viscosity, stable dispersion was obtained. Oil-blue N (0.25 grams, Aldrich) was added to color the dispersion. The suspension was then tested in a standard electrophoretic cell comprising two ITO conductor plates separated by a 24 microns spacer. High contrast, alternating white and blue images were observed with a switching rate of about 60 Hz and a rising time of 8.5 msec at 80 volts.

Example 5

The experiment of Example 4 was repeated, except Oil Red EGN (Aldrich) and an electrophoretic cell with a 24 micron spacer were used. High contrast, alternating red and white images were observed with a switching rate of 60 Hz and a rising time of 12 msec at 60 volts.

Example 6

Ti-Pure R-706 (112 grams) was ground by an attritor in a solution containing 11.2 grams of a maleic anhydride copolymer (Baker Hughes X-5231), 24 grams of 3,4-dichlorobenzotrifluoride, and 24 grams of 1,6-dichlorohexane (both from Aldrich). Similarly, 12 grams of carbon black were ground in a solution containing 1.2 grams of alkylated polyvinylpyrrolidone (Ganex V216 from ISP), 34 grams of 3,4-dichlorobenzotrifluoride and 34 grams of 1,6-dichlorohexane (Aldrich) at 100 ° C. These two dispersions were then mixed homogeneously and tested. High contrast black and white images were observed with a switching rate up to 10 Hz and a rising time of about 36 msec at 100 volts.

Example 7

Pigment Dispersion

Ti Pure R706 (6.42 grams) was dispersed with a homogenizer into a solution containing 1.94 grams of Fluorolink D from Ausimont, 0.22 grams of Fluorolink 7004 also from Ausimont, 0.37 grams of a fluorinated copper phthalocyanine dye from 3M and 52.54 grams of a perfluoro solvent HT-200 (Ausimont).

Example 8

Pigment Dispersion

The same procedure was performed as in Example 7, except the Ti Pure R706 and Fluorolink were replaced by a polymer coated $TiO_2$ particles PC-9003 (Elimentis, Highstown, N.J.) and Krytox (Du Pont), respectively.

Example 9

Sealing the Microcups by One-step Process

A UV curable composition (0.05 ml) comprising 1 wt % of benzil dimethyl ketal (Esacure KB1 from Sartomer) in HDDA (1,6-hexanediol diacrylate from Aldrich) was dispersed into 0.4 ml of a dielectric solvent comprising 0.5 wt % of 2,2,3,3,4,4,5,5,6,6,7,7,8,8,9,9,10,10,10-nonadecafluoro-1-decanol (Aldrich) in FC-43 from 3M Company. The resultant dispersion was then immediately filled into an array of microcups as prepared in Example 2. Excess of fluid was scrapped away by a wiper blade. The HDDA solution was allowed to phase separate for at least 30 seconds and cured by UV radiation (10 $mw/cm^2$) for about 1 minute. A hard, clear layer was observed at the top of the microcups and the microcups were sealed.

Example 10

Microcup Sealing

The electrophoretic fluid prepared in Example 7 was diluted with a volatile perfluoro co-solvent FC-33 from 3M and coated onto an array of 35 micron deep microcups prepared in Example 2. The volatile co-solvent was allowed to evaporate to expose a partially filled microcup array. A 7.5% solution of polyisoprene (97% cis, from Aldrich) in heptane was then overcoated onto the partially filled cups by a Universal Blade Applicator with an opening of 3 mil. The overcoated microcups were then dried at room temperature. A seamless sealing layer of about 7–8 μm thickness (dry) with acceptable adhesion and uniformity was formed at the top of each microcup. No observable entrapped air bubble in the sealed microcups was found under microscope. A second ITO/PET conductor precoated with an adhesive layer was laminated onto the sealed microcups. The electrophoretic cell showed satisfactory switching performance with good flexure resistance. No observable weight loss was found after being aged in a 66° C. oven for 5 days.

Example 11

Microcup Sealing

The same procedure was performed as in Example 10, except the $TiO_2$ dispersion prepared in Example 8 was used. A seamless sealing layer of about 6 microns thickness was observed under microscope. No entrapped air bubbles were observed in the sealed microcups.

Example 12

Sealing the Microcups by the Overcoating and UV Curing Process

The electrophoretic fluid prepared in Example 6 was filled into the microcup array as prepared in Example 2. A thin layer of Norland optical adhesive NOA 60 (Norland Products Inc., New Brunswick, N.J.) was coated onto the filled microcups. Any excess of the UV adhesive was scrapped off by a strip of Mylar film and cleaned by a piece of absorbing paper. The overcoated adhesive was then cured immediately under a Loctite Zeta 7410 UV exposure unit for about 15 minutes. The microcups were sealed completely and no air pocket was observed. The thickness of the cured adhesive layer was about 5–10 microns as measured by a Mitutoyo thickness gauge.

Example 13

Sealing the Microcups by a Two-step (Overcoating and Moisture Curing) Process

The experiment of Example 12 was repeated, except the Norland adhesive was replaced by Instant Krazy glue from Elmer's Products, Inc., Columbus, Ohio. The overcoated adhesive was then cured for 5 minutes by moisture in air. The microcups were sealed completely and no air pocket was observed. The thickness of the cured adhesive layer was about 5–10 microns as measured by a Mitutoyo thickness gauge.

Example 14

Sealing the Microcups by a Two-step (Overcoating and Interfacial Polymerization) Process The experiment of Example 13 was repeated, except the electrophoretic fluid was replaced by a 3,4-dichlorobenzotrifluoride solution containing 0.3 wt % of tetraethylenepentaamine (Aldrich) and the Instant Krazy glue was replaced by an aliphatic polyisocyanate (Desmodur N 3300 from Bayer Corp.) solution in anhydrous ether. A highly crosslinked thin film was observed almost immediately after overcoating. The dielectric solvent was completely sealed inside the microcups after ether was evaporated at room temperature. No air pocket was observed.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A process for the manufacture of an electrophoretic display, which process comprises:
   a) forming microcups on a first non-conducting substrate wherein said microcups have side surface and bottom surface and are separated by partition walls having top surface;
   b) forming a first conductive layer on the side surface and the bottom surface of the microcups and the otp surface of the partition walls;
   c) filling the microcups with an electrophoretic fluid;
   d) sealing the filled microcups; and
   e) forming a second conductive layer over the filled and sealed microcups.

2. The process of claim 1 wherein said microcups are formed by microembossing a thermoplastic or thermoset precursor with a male mold, imagewise exposing a radiation curable material or applying a spacer film having prepunched holes.

3. The process of claim 1 wherein said first conductive layer is formed by thin film deposition.

4. The process of claim 3 wherein said thin film deposition is sputtering or vapor deposition.

5. The process of claim 1 wherein the sealing is accomplished by a sealing composition having a specific gravity lower than that of the electrophoretic fluid.

6. The process of claim 5 wherein said filling and sealing are accomplished by filling a mixture of the electrophoretic fluid and the sealing composition and hardening the sealing composition during or after it phase separates and forms a supernatant layer above the electrophoretic fluid.

7. The process of claim 5 wherein said sealing is accomplished by overcoating the sealing composition on the electrophoretic fluid and hardening the sealing composition.

8. The process of claim 5 wherein said sealing composition is a radiation, heat or moisture curable composition.

9. The process of claim 5 wherein said sealing composition comprises a thermoplastic or thermoset precursor.

10. The process of claim 9 wherein said thermoplastic or thermoset precursor is selected from the group consisting of hydrocarbon rubbers, butadiene rubbers, isoprene rubbers, thermoplastic elastomers, polyvalent acrylates, polyvalent methacrylates, cyanoacrylates, polyvalent vinyls, polyvalent epoxides, polyvalent isocyanates, polyvalent allyls and oligomers and polymers containing crosslinkable functional groups.

11. The process of claim 1 wherein said second conductive layer is formed by thin film deposition or lamination.

12. The process of claim 1 further laminating a second non-conducting substrate over the second conductive layer.

13. The process of claim 1 further comprising forming a third conductive layer between the first non-conducting substrate and the microcups.

14. The process of claim 13 wherein said third conductive layer is formed by thin film deposition or lamination on the first non-conducting substrate.

* * * * *